US007272643B1

(12) United States Patent
Sarkar et al.

(10) Patent No.: US 7,272,643 B1
(45) Date of Patent: Sep. 18, 2007

(54) SYSTEM AND METHOD FOR MANAGING AND PROVISIONING VIRTUAL ROUTERS

(75) Inventors: Manojit Sarkar, Fremont, CA (US); Dileep Kumar, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 34 days.

(21) Appl. No.: 09/663,485

(22) Filed: Sep. 13, 2000

(51) Int. Cl.
*G06F 15/177* (2006.01)
*G06F 15/16* (2006.01)
*G06F 15/173* (2006.01)
*H04L 12/28* (2006.01)

(52) U.S. Cl. ...................... 709/222; 709/223; 709/218; 709/228; 370/392

(58) Field of Classification Search ................ 709/218, 709/223, 224, 228, 222; 370/392
See application file for complete search history.

(56) References Cited

U.S. PATENT DOCUMENTS 4,667,287 A 5/1987 Allen et al.
5,490,252 A 2/1996 Macera et al.
5,581,705 A 12/1996 Passint et al.
5,745,778 A 4/1998 Alfieri
5,825,772 A * 10/1998 Dobbins et al. ............ 370/396
5,838,907 A 11/1998 Hansen
5,841,973 A 11/1998 Kessler et al.
5,867,713 A 2/1999 Shrader et al.
5,870,558 A 2/1999 Branton et al.
5,909,544 A 6/1999 Anderson et al.
5,951,649 A 9/1999 Dobbins et al.
5,963,555 A 10/1999 Takase et al.
5,968,116 A 10/1999 Day et al.
6,012,100 A 1/2000 Frailong et al.
6,026,438 A 2/2000 Piazza et al.
6,047,330 A 4/2000 Stracke
6,069,895 A 5/2000 Ayandeh
6,098,110 A 8/2000 Witkowski et al.
6,169,739 B1 1/2001 Isoyama
6,173,399 B1 1/2001 Gilbrech
6,175,867 B1 1/2001 Taghadoss
6,220,768 B1 * 4/2001 Barroux ...................... 709/224
6,243,580 B1 6/2001 Garner
6,260,072 B1 7/2001 Rodriguez
6,260,073 B1 7/2001 Walker et al.
6,266,695 B1 7/2001 Huang et al.
6,286,038 B1 * 9/2001 Reichmeyer et al. ....... 709/220
6,295,297 B1 9/2001 Lee
6,330,602 B1 12/2001 Law et al.

(Continued)

OTHER PUBLICATIONS

Keshav, "An Engineering Approach to COmputer Networking", 1992, Corporate & Proal Publishing Group, p. 318-324.*

(Continued)

*Primary Examiner*—Saleh Najjar
*Assistant Examiner*—Kevin Bates
(74) *Attorney, Agent, or Firm*—Hamilton, DeSanctis & Cha, LLP

(57) ABSTRACT

Site reachability information is determined for a service processing switch that is communicably coupled to one or more sites. In addition, global routing profiles, customer site profiles and OSPF profiles are defined. The profile data, in addition to or instead of the reachability information is used to generate routing configuration data for one or more Virtual Routers and Virtual Private Networks implemented within the service processing switch.

37 Claims, 6 Drawing Sheets

LEARN ROUTES TO SITES — 602
DISSEMINATE SITE REACHABILITY — 604
DEFINE GLOBAL ROUTINGPROFILE — 606
DEFINE CUSTOM SITE PROFILE — 608
DEFINE CUSTOM OSPF PROFILE — 610
DEFINE CUSTOM EXPORT/IMPORT POLICIES — 612
GENERATE ROUTING CONFIGURATION — 614

U.S. PATENT DOCUMENTS 6,338,092 B1 1/2002 Chao et al.
6,434,619 B1 8/2002 Lim et al.
6,449,650 B1 * 9/2002 Westfall et al. ............. 709/228
6,459,682 B1 10/2002 Ellesson et al.
6,463,061 B1 * 10/2002 Rekhter et al. ............. 370/392
6,466,976 B1 10/2002 Alles et al.
6,526,056 B1 * 2/2003 Rekhter et al. ............. 370/392
6,532,088 B1 3/2003 Dantu et al.
6,556,544 B1 * 4/2003 Lee ........................... 370/256
6,597,699 B1 * 7/2003 Ayres ......................... 370/400
6,636,516 B1 10/2003 Yamano
6,639,897 B1 * 10/2003 Shiomoto et al. ........... 370/238
6,658,013 B1 12/2003 de Boer et al.
6,674,756 B1 * 1/2004 Rao et al. ................... 709/229
6,697,360 B1 * 2/2004 Gai et al. ................... 370/389
6,775,267 B1 8/2004 Kung et al.
6,856,676 B1 2/2005 Pirot et al.
7,155,518 B2 * 12/2006 Forslow ...................... 709/227
7,225,259 B2 * 5/2007 Ho et al. .................... 709/227
2001/0043571 A1 11/2001 Jang et al.
2001/0052013 A1 12/2001 Munguia et al.
2002/0152373 A1 10/2002 Sun et al.
2003/0033401 A1 2/2003 Poisson et al.

OTHER PUBLICATIONS

Miyoshi, Hanaki.,et al. ,"Lan/Wan management integration using ATM CNM interface", *IEEE Network Operations and Management Symp., Kyoto, XP000641074*, vol. 1, Symp. 5,(Apr. 15, 1996),12-21.
Tanenbaum, A..S. ,"Computer Networks", *3rd edition, Prentice Hall Int'l USA XP002189337*, (1996),364, 348.
Gasparro, D.M., "Next-Gen VPNs: The Design Challenge." Data Communications. Sep. 1999. pp. 83-95.
Hanaki, M. et al., "LAN/WAN management integration using ATM CNM interface." IEEE Network Operations Management Symposium, vol. 1. Apr. 1996. pp. 12-21.
Kapustka, S., "CoSine Communications Move VPNs 'Into the Cloud' with the Leading Managed IP Service Delivery Platform." http://wwwcosinecom.com/news/pr_5_24.html. Press Release, CoSine Communications. 1995. p. 5.
Keshav, S., "An Engineering Approach to Computer Networking: ATM networks, the internet, and the telephone network." Reading Mass: Addison-Wesley, Addison-Wesley Professional Computing Series. 1992. pp. 318-324.
Kim, E.C. et al., "The Multi-Layer VPN Management Architecture." Proc. Sixth IFIP/IEEE International Symposium on Integrated Network Management. May 1999. pp. 187-200.
Rao, J.R., Intranets and VPNs: Strategic Approach. 1988 Annual Review of Communications. 1998. pp. 669-674.
Tanenbaum, A.S., "Computer Networks." Upper Saddle River, N.J.: Prentice Hall PTR, 3rd Edition. 1996. pp. 348-364.
European Search Report for PCT/US03/37009 (Jul. 4, 2004) 2 pgs.
International Search Report for PCTUS03/17674. 6 pgs.
Chan, M.C. et al., "Customer Network Management and Control of Broadband VPN Services." Proc. Fifth IFIP/IEEE International Symposium on Integrated Network Management. May 1997. pp. 301-314.
Chan, M.C. et al., "An Architecture for Broadband Virtual Networks Under Customer Control." IEEE NOMS. Apr. 1996. pp. 135-144.
Keshav, S., "An Engineering Approach to Computer Networking: ATM networks, the internet, and the telephone network." Reading Mass: Addison-Wesley, Addison-Wesley Professional Computing Series. 1992. pp. 318-324.
Kim, E.C. et al., "The Multi-Layer VPN Management Architecture." Proc. Sixth IFIP/IEEE International Symposium on Integrated Network Management. May 1999. pp. 187-200.
Rao, J.R., Intranets and VPNs: Strategic Approach. 1988 Annual Review of Communications. 1998. pp. 669-674.
Tanenbaum, A.S., "Computer Networks." Upper Saddle River, N.J.: Prentice Hall PTR, 3rd Edition. 1996. pp. 348-364.
European Search Report for PCT/US03/37009 (Jul. 4, 2004) 2 pgs.
International Search Report for PCTUS03/17674. 6 pgs, no date.
Chan, M.C. et al., "Customer Network Management and Control of Broadband VPN Services." Proc. Fifth IFIP/IEEE International Symposium on Integrated Network Management. May 1997. pp. 301-314.
Chan, M.C. et al., "An Architecture for Broadband Virtual Networks Under Customer Control." IEEE NOMS. Apr. 1996. pp. 135-144.
Cisco 12000 Series Router Configuration Guide for Cisco IOS Release 12.OS, 92 pgs.
Cisco IOS Command Line Interface Tutorial. Cisco—IOS Tutorial. http://www.cisco.com/warp/cpropub/45/tutorial.htm. pp. 1-9, May 2007.
Cisco Router Configuration Tutorial. Cisco Inter-Network Operating System: Cisco IOS Modes of Operation, 11 pgs, no date.
Cisco 1710 Security Router Software Configuration Guide, 88 pgs, no date.

* cited by examiner

SYSTEM AND METHOD FOR MANAGING AND PROVISIONING VIRTUAL ROUTERS

FIELD

The present invention relates generally to computer network routers, and more particularly to systems and methods of managing virtual routers.

RELATED FILES

This application is related to the following cofiled, copending and coassigned applications:

"SYSTEM AND METHOD FOR MANAGING ROUTER METADATA", Ser. No. 09/663,484, and to two provisional applications each titled "SYSTEMS AND METHOD FOR DELIVERING INTERNETWORKING SERVICES" having application Nos. 60/232,516 and 60/232,577;

all of which are hereby incorporated herein by reference for all purposes.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright ® 2000, CoSine Communications, Inc. All Rights Reserved.

BACKGROUND

The interest in the deployment of virtual private networks (VPNs) across IP backbone facilities is growing every-day. In general, VPNs fall into two categories: CPE-based (Customer Provided Equipment) VPNs and network-based VPNs.

With CPE-based VPNs, the ISP network provides only layer 2 connectivity to the customer. The CPE router takes ownership of setting up tunnels and handling routing with other sites. Network-based VPNs consist of a mesh of tunnels between ISP routers. They also have the routing capabilities required to forward traffic from each customer site. Each ISP router has a VPN-specific forwarding table that contains VPN member sites. The benefit offered by network-based VPNs is that the ISP is responsible for routing configuration and tunnel setup. In addition, other services, such as firewall, Quality of Service (QOS) processing, virus scanning, and intrusion detection can be handled by a small number of ISP routers. New services can be introduced and managed without the need to upgrade CPE devices.

There are typically three steps to building a VPN's infrastructure:

1) Define a topology and create tunnels using IPSec, LT2P, PPTP, GRE, or MPLS.
2) Configure routing on the edge routers to disseminate site- and intra-VPN reachability information.
3) Enable such services as firewall, QOS, and so forth.

Usually, IP network managers use the following model for building and maintaining their networks:

1) With the help of some network experts, design the network.
2) Use the command line interface (CLI) or ASCII configuration files to define the routing configuration.
3) Use trial-and-error method to determine a working solution for the network configuration.
4) Manually manage configuration files for routers.

The process of building or changing a network requires significant manual effort, and is slow, expensive, and error-prone. For ISPs that plan to provide VPN services, this model for provisioning VPNs is problematic. ISPs need to configure routing for VPNs, each of which can be considered separate networks.

As noted above, building and managing one network is difficult, the problem is made much worse when the ISP must build and manage thousands of networks. For ISPs to succeed at this, a facilitation framework is required.

As a result, there is a need in the art for the present invention.

SUMMARY

The above-mentioned shortcomings, disadvantages and problems are addressed by the present invention, which will be understood by reading and studying the following specification.

To enable ISPs to deliver services using service processing switches, systems and methods are provided that make provisioning VPNs very easy. The systems and methods described reduce the resources required to provision and manage a VPN network. For example, it is possible for ISPs to provision thousands of VPNs, each with a variety of services. The routing is a component of the VPN infrastructure.

In one embodiment of the invention, site reachability information is determined for a service processing switch that is communicably coupled to one or more sites. In addition, global routing profiles, customer site profiles and OSPF profiles are defined. The profile data, in addition to or instead of the reachability information is used to generate routing configuration data for one or more Virtual Routers and Virtual Private Networks implemented within the service processing switch.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense.

In the Figures, the same reference number is used throughout to refer to an identical component which appears in multiple Figures. Signals and connections may be referred to by the same reference number or label, and the actual meaning will be clear from its use in the context of the description.

The detailed description is divided into multiple sections. In the first section the hardware and operating environment of different embodiments of the invention is described. In the second section, the software environment of varying embodiments of the invention is described. In the final section, a conclusion is provided.

Hardware and Operating Environment

Figure 1:
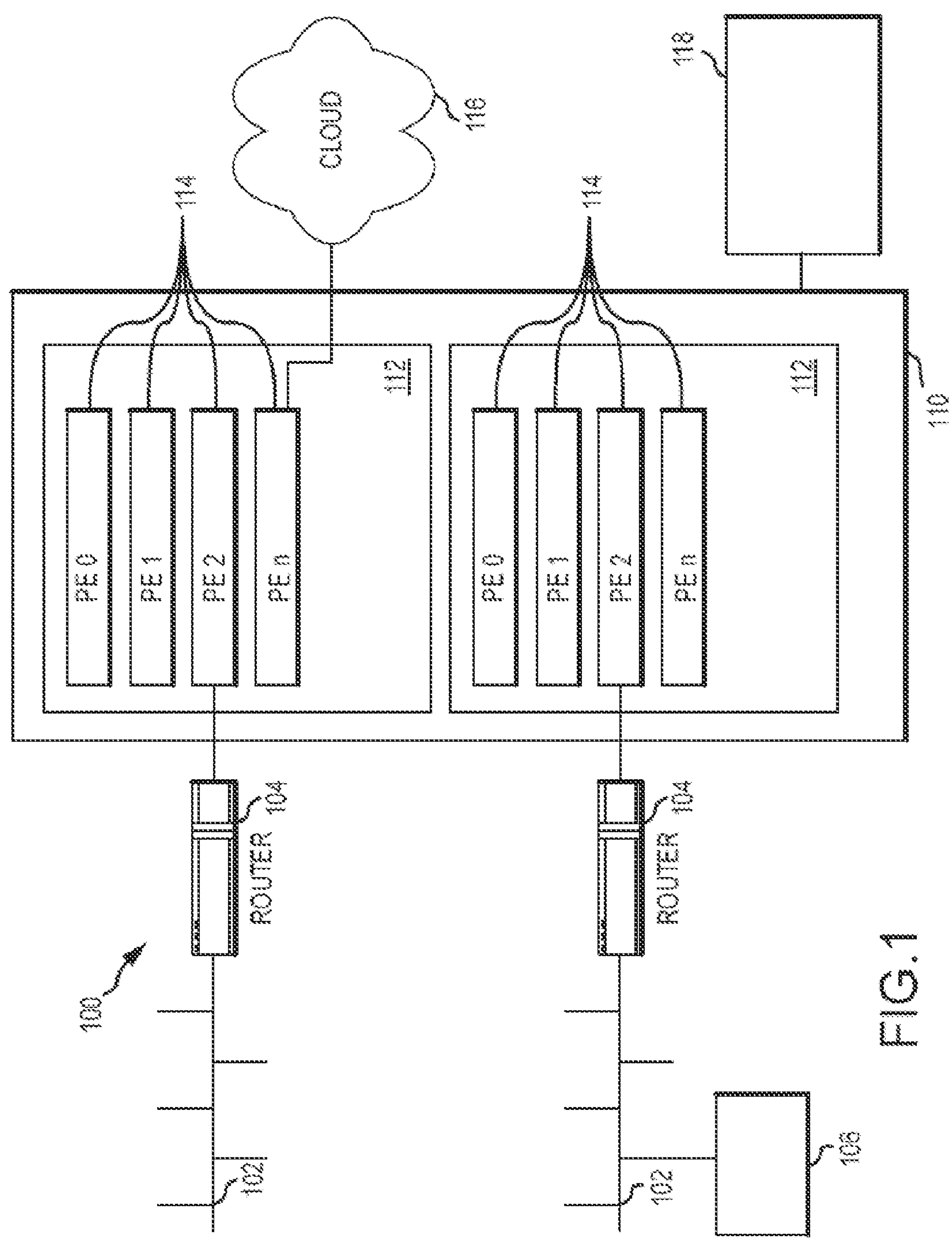
FIG. 1 is a block diagram of the hardware and operating environment in which different embodiments of the invention can be practiced.

FIG. 1 is a diagram of the hardware and operating environment in conjunction with which embodiments of the invention may be practiced. The description of FIG. 1 is intended to provide a brief, general description of suitable computer routing hardware and a suitable computing environment in conjunction with which the invention may be implemented. Although not required, the invention is described in the general context of computer-executable instructions, such as program modules, being executed by a computer, such as a personal computer or a server computer. Generally, program modules include routines, programs, objects, components, data structures, etc., that perform particular tasks or implement particular abstract data types.

As shown in FIG. 1, the system 100 includes a service processing switch 110, access routers 104, service management system 118, and customer network management system 106. In some embodiments, service processing switch 110 provides switching, routing and computing resources that can be allocated by a service provider to customers. In one embodiment, the service processing switch 110 is the IPSX 9000 service processing switch from CoSine Communications, Inc. However, the invention is not limited to any particular switch, router or service processing hardware.

Service processing switch can contain one or more blades 112. In some embodiments of the invention, blades 112 have a type associated with them. Examples of blade types include, processing functions such as network blades, control blades, trunk blades, and processor blades. Network blades provide interfaces to different types of networks. Control blades provide system management and accounting functions to the service processing system 110. Trunk blades provide access to high speed trunk networks. Processor blades provide general purpose computer processors that in some embodiments of the invention provide firewall, intrusion detection, or directory services. Blades are communicably coupled to one another, in one embodiment a packet ring is used to couple the blades.

In some embodiments, each of blades 112 includes one more processing elements 114. Processing elements 114 include CPU and memory that provide computing resources for the blade. The invention is not limited to any particular number of processing elements on a blade, nor is the invention limited to any particular number of blades in a service processing switch 110.

Service processing system 110 is typically communicably coupled to a network 116, for example the Internet. Network 116 can also be a Wide Area Network (WAN), a Local Area Network (LAN), or a private network.

Service processing system 110 is also typically communicably coupled to a plurality of customer networks 102 via customer access routers 104.

Service management system 118 hosts software that is used to configure and control the operation of service processing switch 110. In one embodiment of the invention, the service management system is a SPARC system available from Sun Microsystems, Inc. running the InVision product from CoSine Communications, Inc. Service management system 118 can be used to allocate resources within service processing switch 110 to various customers. In one embodiment of the invention, service management system 118 communicates with service processing switch 110 using the Simple Network Management Protocol (SNMP). The operation of service management system 118 will be described in further detail in the sections that follow.

Customer network management system 106 hosts software that configures and controls the resources within service processing switch 110 that have been allocated to the particular customer. The operation of customer network management system 106 will be described in further detail in the sections that follow.

Those skilled in the art will appreciate that the invention may be practiced with other routing system hardware configurations besides those described above.

Software Environment

The embodiments of the invention include a software environment of systems and methods that provide a mechanism for simplifying the provisioning and management of VPN (Virtual Private Networks) and VRs (Virtual Routers) within a service processing switch. The embodiments of the invention provide a policy-based mechanism for network provisioning. Thus a service provider, for example, an ISP (Internet Service Provider), managing a service processing switch can create various service policies, which are used in defining VPN profiles. These profiles are used to automatically generate tunnels, routing, and other service configurations for VPNs. Resources within switch 110 such as blades and processing elements are allocated by a service provider to one or more customers, who then can configure those elements allocated to it. Configuration from the service provider's perspective, and from the customer's perspective can be driven based on profiles.

Figure 2:
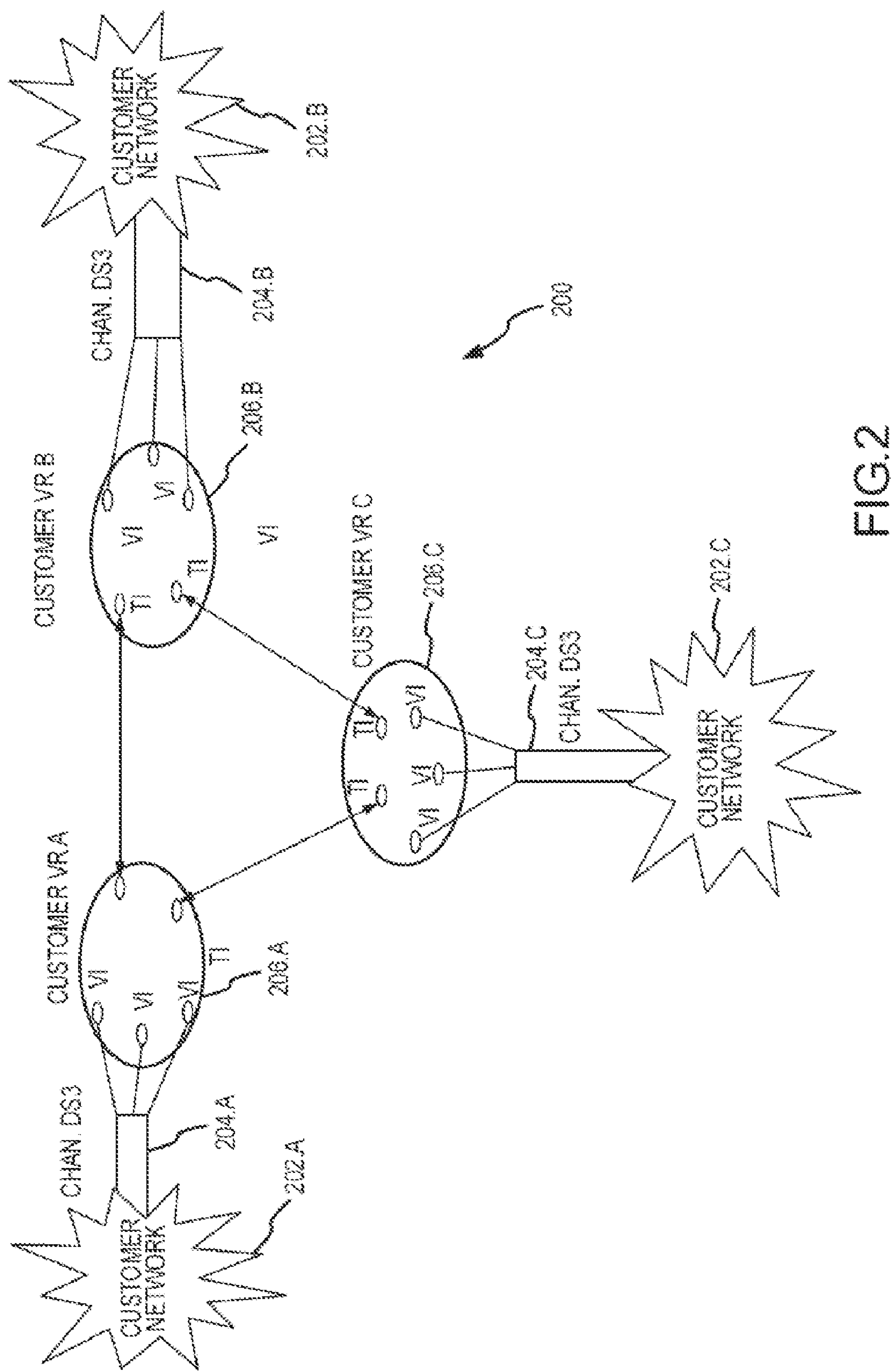
FIG. 2 is a diagram illustrating an exemplary Virtual Private Network used in embodiments of the invention.

FIG. 2 provides an illustration of a VPN as used in various embodiments of the invention. A VPN is typically a logical grouping of virtual routers (VRs) 206. The connectivity between VPNs and customer sites 202 is provided by means of virtual interfaces (VIs). Users can create VIs and connect them to customer sites or to VIs of other VRs. The virtual connection can also be configured to be a tunnel interface (TI) to a type of secured tunnel, such as an IPSec tunnel.

Customer sites can be connected via a network interface 204, which can be a leased line interface such as DS3. The invention is not limited to any particular type of network interface.

Figure 3:
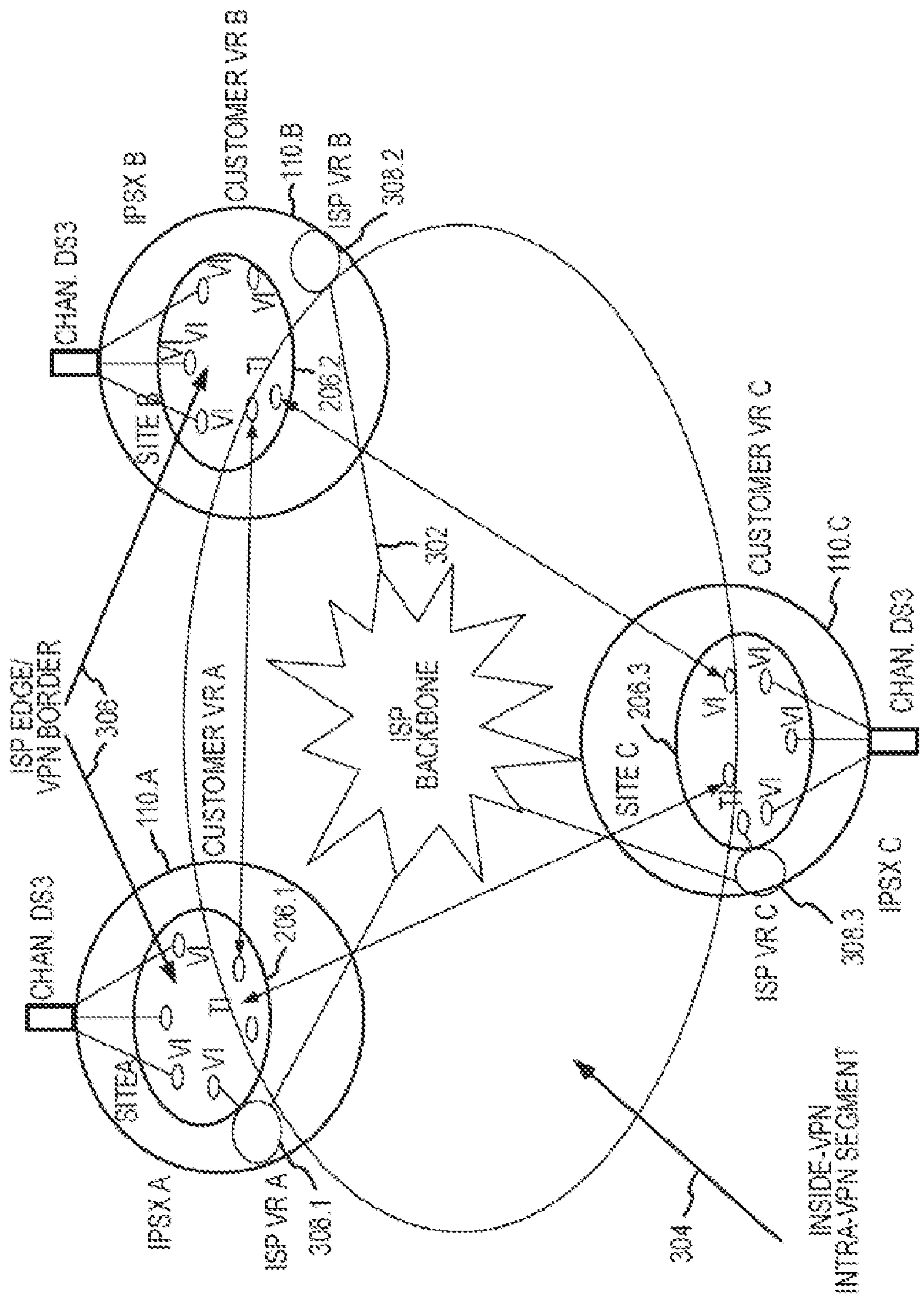
FIG. 3 is a diagram illustrating further details segments of an exemplary Virtual Private Network used in embodiments of the invention.

In some embodiments of the invention, two types of virtual routers are supported: Customer VRs and ISP VRs. Customer VRs are used to build customer VPNs, and ISP VRs are used to build ISP VPN. The ISP VPN is connected to an ISP backbone network 310 (FIG. 3). In this framework, each ISP needs only one ISP VPN. Customer VRs can be connected to the ISP VPN by means of VIs. Every virtual router can use one or more routing protocols, including STATIC, RIP, OSPF, and BGP, to disseminate reachability information. For routing purposes, every VPN based on this framework can be treated as an extension of the customer network.

The embodiments of the invention allow network managers to define profiles. The profile information is used to automatically generate the routing configuration for a VPN. In some embodiments, to profile the routing on a VPN, a customer VPN is divided into three segments, which are illustrated in FIG. 3.

ISP-Edge segment 306 is a VPN segment that connects the VPN to customer sites. This segment includes all virtual interfaces connected to logical interfaces and tunnel interfaces whose remote end is outside the VPN. This segment is used for disseminating customer site reachability information.

Inside-VPN segment 304 (also referred to as an Intra-VPN segment) is a VPN segment that provides connectivity among different VRs 206. This segment is used to disseminate intra-VPN reachability information.

Inter-VPN segment 302 is a VPN segment that connects different types of VPNs; for example, the interfaces that connect a customer VPN with an ISP VPN.

It is desirable to identify segment types, because it provides a mechanism for generating profiles that can be optimized depending on the segment type.

Profile-Based Routing Configuration

Figure 4:
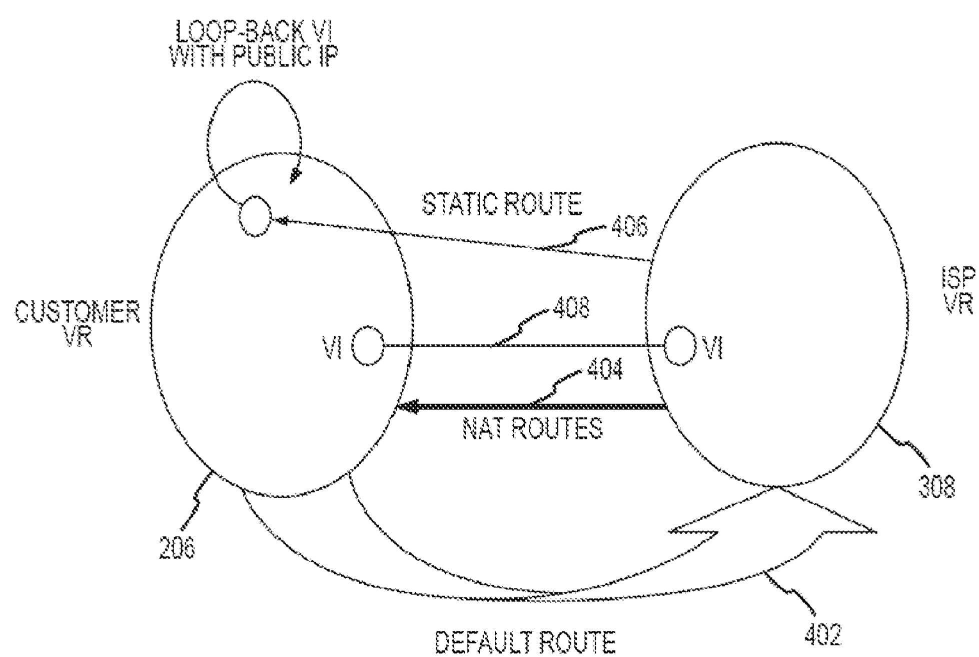
FIG. 4 is a diagram illustrating Inter-VPN reachability.

FIG. 4 illustrates how the routing needs of the Inter-VPN segment 302 are taken care of at the time a VR is created. When a customer VR 206 is created, the user is given the option to automatically connect the customer VR 206 with an ISP VR 308. At that time, service management system 118 (FIG. 1) also creates a default route 402 on the customer VR 206 and a static route 406 on the ISP VR 308, which accommodates customer VR 206 to ISP VR 308 connectivity. In this model, for all network address translation (NAT) addresses 404, the user must add static routes on the ISP VPN.

The profile discussed here takes care of the first two VPN segments: ISP-Edge 306 and Intra-VPN 304. Given a VPN's routing requirements, there are typically three routing aspects that are considered:

1) The routing protocol that should be turned on a virtual interface in a VR
2) When and how to redistribute routes between various routing protocols.
3) When enabling a routing protocol on a router or interface, the routing parameters to use for optimizing performance.

Service management system 118 (FIG. 1) uses VPN profile data to automatically generate the required routing configuration. In some embodiments of the invention BGP (Border Gateway Protocol) is excluded as a possible choice for configuring customer VPNs. There are a few reasons for this. First, there are only two cases in which BGP would be used in a VPN environment. ISP-VPNs might use BGP to talk to the Internet core. Also, if a VPN connects two very large customer sites, IBGP might be needed for the Intra-VPN segment to ensure scalability. There will generally be very few ISP VPNs (in most networks, there is only one), and it's unlikely that a VPN will be used to connect two or more large sites.

The second reason for excluding BGP from the profile is the VR-specific customization that is required to make BGP work in a VPN environment. Because BGP connects ISP VRs to the ISP core, a careful selection of export and import policies is needed to minimize the number of routes in each ISP VR. It is very difficult to represent this type of configuration by means of a generic routing profile. Service management system 118 (FIG. 1) provides an interface to configure BGP on VRs. This interface allows user to enable BGP on a VR, set its BGP neighbors, and add import and export policies.

In some embodiments of the invention, the profile defines a simple routing configuration, that is, static routing for the Intra-VPN segment. Thus static routing will be used to communicate with each customer site. This configuration is desirable because it puts a minimum load on the device, thus increasing the number of VPNs that can be managed by each service processing switch 110.

There are two issues with static routing. First, ISPs need to manage static routes for each customer. As new subnets are added to customer networks and old ones are removed, the static routes corresponding to these subnets should be added or removed in the corresponding VPNs. In some embodiments, this problem can be solved by having service management system 118 (FIG. 1) takes ownership of automatically managing static routes based on the customer site subnet information. In these cases, customers can directly add or remove subnet information using tools such as the customer network management system 106 (FIG. 1). This capability will transfer the ownership of managing routing to customers.

A second issue with static routing is that the routing by definition is STATIC. If a site interface is down, traffic cannot be re-routed to an alternate path. A partial solution to this problem can be provided by allowing customer to disable routing on a site that is down. This can be done by means of a customer network management system 106 (FIG. 1). In this scenario, service management system 118 (FIG. 1) would remove the static routes from the network that belongs to the site that is down. This action would allow the traffic to go through the backup path.

Figure 5:
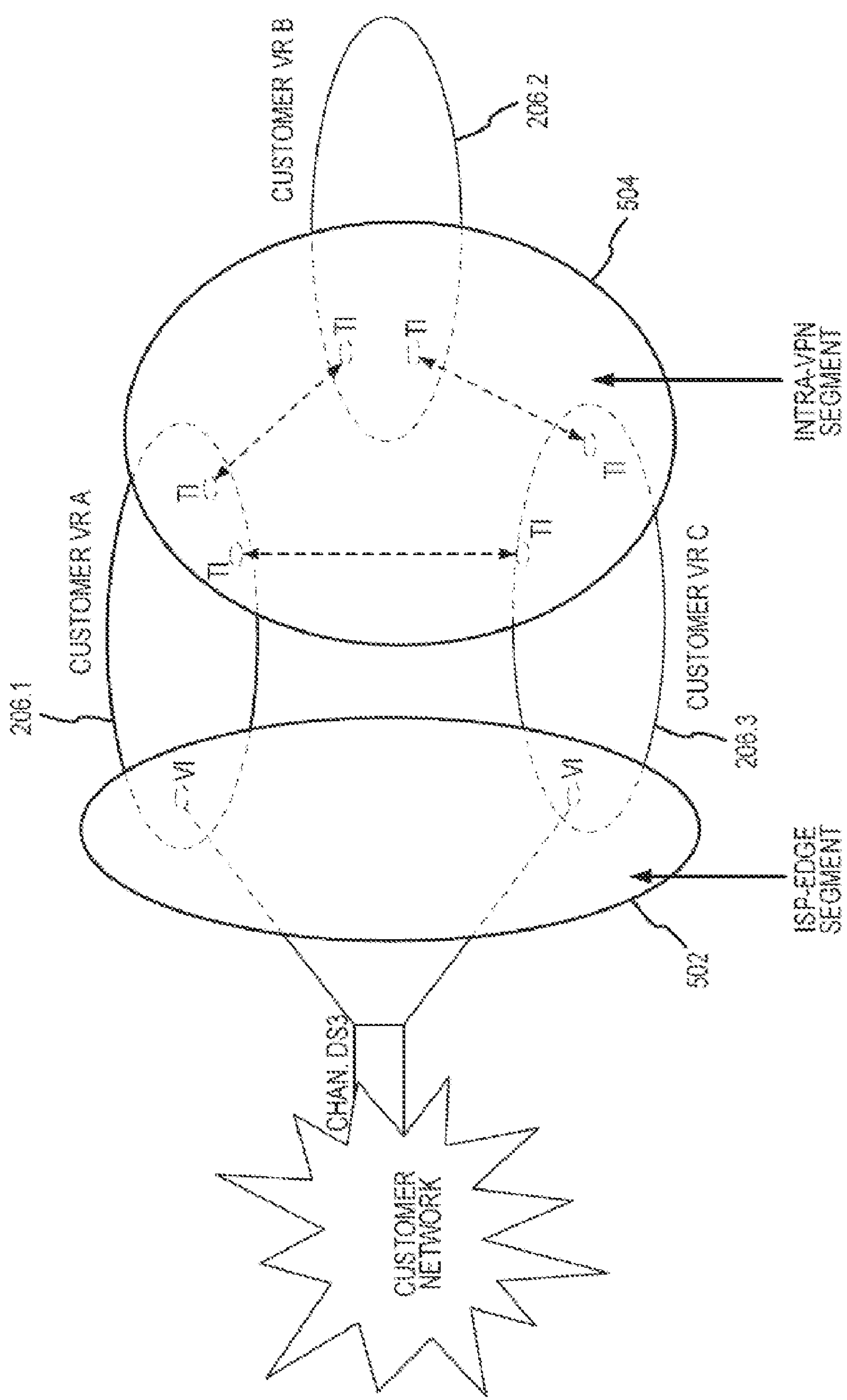
FIG. 5 is a diagram illustrating dynamic intra-VPN routing.

To resolve the two issues described above, the embodiments of the invention provide a mechanism for a user to choose more advanced routing options in profiles. For smaller sites, a viable option is RIP (Routing Information Protocol), while for large sites operators might choose OSPF (Open Shortest Path First gateway protocol). The dynamic routing transfers the burden of managing route changes from the network manager to the device. If a user selects dynamic routing at the edge, then the service management system will also have to use dynamic routing to disseminate Intra-VPN reachability information. FIG. 5 illustrates this scenario. If a site link to virtual router A 206.1 is down, virtual router B 206.2 will know that the traffic going through that link needs to be rerouted to virtual router C 206.3 only if dynamic routing is specified for Intra-VPN segment 504.

If all the sites (ISP-Edge segment) are using static or RIP routing, service management system 118 will allow the user to choose between RIP and OSPF for Intra-VPN routing.

The user will typically select RIP if there are relatively few VRs in the VPN. Because OSPF is more scalable, it is a logical choice for bigger VPNs. If a user decides to run OSPF at a site edge, it is desirable to select OSPF for the Intra-VPN segment.

This section has described the various software components in a system that provides for the automatic generation and provisioning of routing configurations. As those of skill in the art will appreciate, the software can be written in any of a number of programming languages known in the art, including but not limited to C/C++, Java, Visual Basic, Smalltalk, Pascal, Ada and similar programming languages. The invention is not limited to any particular programming language for implementation.

Methods for Performing Profile-Based Routing Configuration

Figure 6:
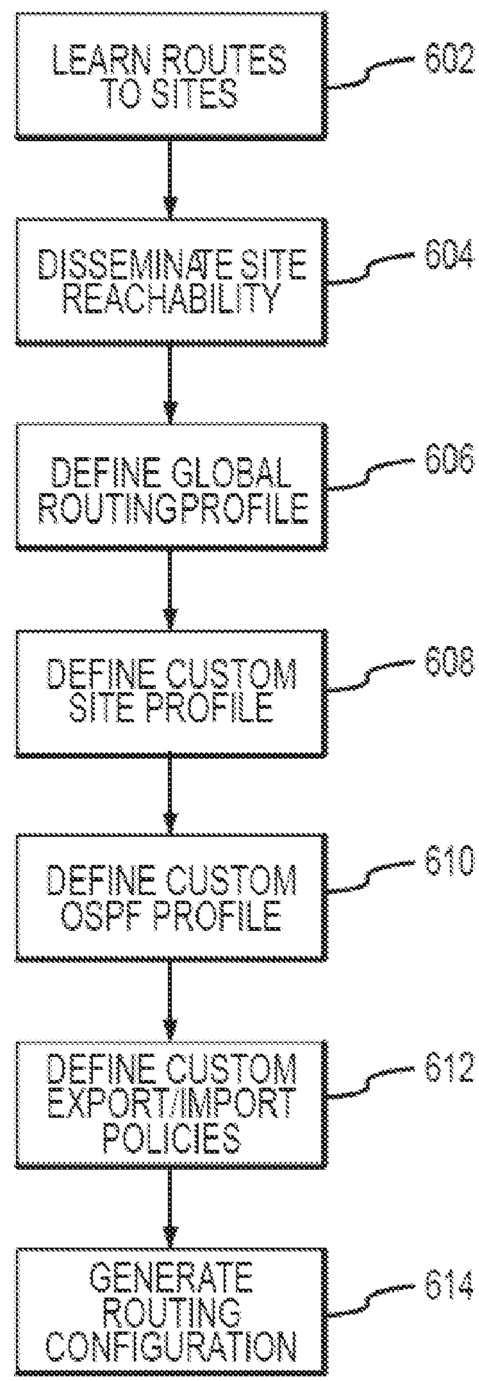
FIG. 6 is a flowchart illustrating a method for provisioning a router configuration according to an embodiment of the invention.

In the previous section, a system level overviews of the operation of exemplary embodiments of the invention were described. In this section, the particular methods of the invention performed by an operating environment executing an exemplary embodiment are described by reference to a flowchart shown in FIG. 6. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media). The method illustrated in FIG. 6 is inclusive of the acts required to be taken by an operating environment executing an exemplary embodiment of the invention.

The method begins at block 602 when a system executing the method learns, or discovers, the current routes to sites connected via the service processing switch 110 (FIG. 1). To build or include new sites in a VPN, each edge router must learn the routes to all sites connected to all the edges in the network. An edge in a network is a boundary between two routers, an edge router is typically a network device that routes data between one or more local area networks and a backbone network. Two components of routing information are typically needed for the VPN:

1) Site Reachability Information: Each edge router needs to learn the set of VPN addresses and address prefixes reachable at each site. The reachability information needed by the CPE (Customer Provided Equipment) router depends on site configuration. Customer sites are characterized into two categories: stub sites and non-stub sites. The CPE routers of stub sites have default routes pointing to an ISP edge router, while the CPE router of non-stub site do not, and therefor need to know the set of non-local destinations reachable via that link. Usually, if a VPN also provides Internet connectivity to a site and there is no backdoor connection between this and any other site, it is a stub site.
2) Intra-VPN Reachability Information: Once an edge router has learned the set of prefixes associated with each of its customer site's links, this information must be disseminated to each other router in the VPN.

After learning routes to sites, the system disseminates site reachability information (block 604). Various embodiments of the invention employ different mechanisms to disseminate the information. In one embodiment, static configuration is used. In static configuration, all the subnets associated with each customer site are manually configured into the VPN. To increase the manageability of this information, customer network management (CNM) 116 (FIG. 1) tools can be enhanced to allow customers to directly add and remove subnet information from the VPN. The subnet information can be used to automatically create the static routes in the VPN. In this case, the customer also needs to add static routes to the CPE routers of non-stub sites.

In an alternative embodiment, directory lookup is used to disseminate the site routing information. A central directory server can maintain the identities of edge routers associated with a VPN, and the set of customer site links bound to the VPN per edge router. Each edge router can query this information using some defined mechanism (for example, LDAP) upon startup. This mechanism requires some kind of database synchronization mechanism in order for all edge routers to learn the addition and deletion of sites from the VPN.

In a further alternative embodiment, a routing protocol can be run between the CPE edge router and the ISP edge router to exchange reachability information. This allows an ISP edge router to learn the prefixes that can be reached at a customer site, and enables a CPE router to learn the destinations that can be reached via the provider network.

In a still further embodiment, if a CPE router runs Multiprotocol Label Switching (MPLS), the MPLS LDP (Label Distribution Protocol) can be extended to convey the set of prefixes at each stub site, together with the appropriate labeling information.

In addition to the above, several mechanisms for Disseminating Intra-VPN Reachability Information can be used. In one embodiment employing static configuration, The service management system 118 can use the subnets configured for each site to automatically create static routes for dissemination of intra-VPN reachability information.

In an alternative embodiment, directory lookup information is used. In addition to VPN membership information, a central directory can maintain a listing of the address prefixes associated with each end point.

In a further alternative embodiment, each edge router runs an instance of a routing protocol on each VPN to disseminate intra-VPN reachability information. Using this mechanism, both full-mesh and arbitrary, VPN topologies can be easily supported.

A still further alternative embodiment uses a Link Reachability Protocol. Here each edge router can run a link reachability protocol carrying the necessary information. This protocol runs across the tunnel between the two edge routers. The two preferred choices for this approach are a variation of MPLS LDP and IBGP. The link reachability protocol-based schemes can support only fully meshed VPNs.

In yet a further alternative embodiment, site reachability information is disseminated by Piggybacking on IP Backbone Routing Protocols. The set of address prefixes associated with each stub interface can also be piggybacked into the routing advertisements from each edge router and propagated through the network. Other edge routers extract this information from received route advertisements. This scheme typically requires that intermediate routers cache intra-VPN routing information to propagate the data further. This also has implications for the level of security possible for intra-VPN routing information.

In addition to learning and disseminating site reachability information, a global routing profile can be defined (block 606). In one embodiment of the invention, the global routing profile includes the following parameters:

a. Routing administration status
b. Routing protocol for Intra-VPN segments c. Default routing protocol at the ISP edge. All the customer sites will generally inherit this.

d. Default site type: stub or non-stub: Stub sites have a default route going toward the ISP VPN (Internet). For stub sites, there is no need to export routes from the VPN. This information is used in creating default export and import policies.

e. If the routing protocol for the Intra-VPN segment is OSPF, define the OSPF profile topology type.

When a site is added, it inherits the routing configuration from the routing profile.

In addition, the system provides for the definition of a custom site profile (block 608) Multiple types of site information can be configured. First, if the site routing profile needs to be customized, the user may do so. Second, if a user wants static routing at the edge, the network subnets that are associated with the site must be provided. This configuration will allow the service management system to automatically create static routes. In one embodiment of the invention, the site profile contains following parameters:

a. Routing Protocol at the ISP edge b. Site Type: stub or non-stub c. OSPF Area ID: If OSPF is enabled at the edge d. Site subnets.

In addition, a custom OSPF profile can be defined (block 610). When a user configures a routing profile, service management system 118 (FIG. 1) automatically generates OSPF, RIP, and static profiles, if needed. In many cases, the user will want to customize the generic OSPF profile. The user can customize the generated profile using a policy-based profile configuration workflow. The workflow includes the following features:

1) The user can define custom OSPF areas. He only needs to configure what VRs are included in what areas; Service management system 118 (FIG. 1) generates the required configuration for each VR and VI.

2) The user can define a route aggregation policy for an OSPF area; Service management system 118 (FIG. 1) will auto-generate this configuration for all the VRs in that area.

3) By default, Service management system 118 (FIG. 1) generates one VR routing parameter policy, which applies to all VRs, and three VI routing parameter policies which apply to tunnel interfaces, customer site edges, and VI-VI connections. When routing configuration is generated, these policies are used to define routing parameters. The user can make changes in any of these policies, or create his own policies and assign them as defaults. The user also can define policies and set them to be applied on a set of VRs or VIs. Service management system 118 (FIG. 1) allows users to individually customize parameters for a VR or VI.

When configuring OSPF for intra-VPN segment, the service management system cannot use the same guidelines as those used in setting up a normal OSPF network, because each router in a VPN is a virtual router. To optimize performance, it is desirable to minimize the size of the routing table. This can be accomplished by keeping the OSPF areas small. In a normal OSPF network, the network manager would not let the size of an OSPF area grow beyond 50-60 routers. With a VPN, it is desirable to not let the OSPF area grow beyond 20-25 VRs. The larger the OSPF area, the higher the load on each VR, and hence the fewer the VRs that can be created on the service processing switch. As a result, it is not desirable to make a complete mesh of all the VRs in a large VPN. The user should use a custom OSPF topology and create areas of reasonable size to ensure scalability and stability of the OSPF network.

The system also provides for the definition of custom export/import policies (block 612). Using the router and site profile defined above, service management system 118 (FIG. 1) generates default policies necessary for different routing protocols to talk to each other. In some situations, custom export and import policies are needed to control access to critical networks. The system allows users to add custom export and import policies.

Based on the site reachability information and/or the global and custom profiles described above, the service management system generates routing configuration (block 614). Described below are items that are considered during the generation of the configuration:

The user can only configure one protocol for the Intra-VPN segment. This configuration is used to configure the routing on all the interfaces that connect one VR to another in the same VPN. In most cases, this takes care of all tunnel interfaces.

If the user selects static routing for a site, service management system 118 (FIG. 1) will auto-generate one static route per site subnet on the local VR. If the routing for the Intra-VPN segment is also static, service management system 118 (FIG. 1) will also generate one static route per subnet on each remote VR. Auto-generation of static routes assumes a meshed-topology for the VPN. If the topology is not meshed, some additional configuration may be needed for the routing to work.

If select dynamic routing is selected for the Intra-VPN segment, service management system 118 (FIG. 1) auto-generates export policies to disseminate site reachability information to other VRs.

For a non-stub site that is using dynamic routing to communicate with the VPN, service management system 118 (FIG. 1) will create an export policy to inject all the routes learned from the Intra-VPN segment's routing into the customer network.

If the user selects a custom OSPF topology for the Intra-VPN segment, he does not have to explicitly assign an area ID for each interface. Service management system 118 (FIG. 1) automatically interprets this information from the area configuration.

Once the profile is set, Service management system 118 (FIG. 1) automatically handles the routing configuration for the addition and deletion of VRs and VIs. For example, if standard OSPF routing has been selected for the Intra-VPN segment, whenever the user creates an IPSec tunnel connecting two VRs, OSPF will be enabled with area ID 0.0.0.0.

If a VPN is using only one routing protocol for the Intra-VPN segment, service management system 118 (FIG. 1) can discover routing profiles from the device configuration.

Service management system 118 (FIG. 1) supports explicit two-phase provisioning of routing profile configurations. In the first phase, the user makes changes to the routing profile and saves them in the database. In the second phase, the user commits the profile to the network. In this phase, the server translates delta changes in the profile configuration into a required low-level configuration and pushes it to appropriate devices.

Service management system 118 (FIG. 1) allows users to temporarily remove routing configurations from the device. Users can do this by providing administration status attributes for the routing profile. Setting this attribute to a "disabled" state and committing the profile removes configurations from the device. Routing can be turned on again by setting the admin status to "enabled."

As can be seen from the above, the generated and customized policies can act as templates that can be applied to particular VPNs, particular VRs, or groups of VRs. For example, assume an existing policy has been changed or further customized. In one embodiment of the invention, the user is presented with a list of VRs or VPNs that were configured with the existing policy. The user can then select the VRs to which the new policy should be applied.

Similarly, assume that the user wishes to change the policy for a particular VR. In one embodiment of the invention, the user selects the desired VR, and then selects a new policy to be applied to the VR. The new policy can then be applied immediately, or it can be applied at a later scheduled time.

In addition, the policies can be used as a differentiator in providing VPN services. If user selects STATIC routing for ISP-Edge and Intra-VPN segments, the service processing switch does not need to run any routing instances per customer VR. On the other hand, if a user has chosen to run dynamic routing for Intra-VPN and ISP edge segments, the switch may have to run instances of routing protocols such as OSPF and RIP. Running routing instances on virtual routers consumes both processing power and memory on the processing elements and blades. The demand on the resources will depend on the size of VPN and its interaction with various customer sites. An ISP can recover the cost of the increased resource usage, by using routing as a differentiator in providing VPN services. There are few methods of providing services:

1) Allow user to select the routing protocol per site: STATIC, RIP, or OSPF. Based on the site configuration, ISP can automatically configure routing protocol for intra-VPN segment. The cost of the service should be the lowest for STATIC and the highest for OSPF.
2) Define a few fixed routing profiles and sell them as a part of service packets such as Gold, Silver, and Bronze. For instance, Gold will allow a user to select OSPF for intra-VPN as well as ISP edge segment. Silver will allow the user to configure OSPF for intra-VPN segment, while RIP for ISP edge. The bronze packet will permit the customer to configure STATIC for ISP edge as well as Intra-VPN segment.
3) Provide additional services as part of a profile. For example, include firewall, intrusion detection, network address translation, proxy services, or other network services as part of a differentiated service package. The service can then be included in profiles defined as part of the service package, and excluded from profiles for customers that do not pay for the service.

CONCLUSION

Systems and methods for generating and provisioning router configurations are disclosed. The embodiments of the invention provide advantages over previous systems. For example, the embodiments of the invention provide a mechanism for easily and rapidly generating configuration information for large numbers of virtual routers and virtual private networks based on profiles. In addition, the embodiments of the invention separate the connectivity and routing needs of each VPN, thus significantly reduced the complexity of the network design. This separation also enables layering of advanced services to specific subscribers' networks. Visibility of subscriber services is end-to-end. The topology and routing needs of each VPN depend on the number and size of customer sites.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

What is claimed is:

1. A method comprising:

causing a subset of processing resources of a plurality of processing elements of a service processing switch to be allocated among a plurality of customers of a service provider by establishing a plurality of virtual routers (VRs) and assigning a subset of the VRs to the plurality of customers; and performing a profile-driven routing configuration of a customer virtual private network (VPN) of a first customer of the plurality of customers by programmatically determining a set of site reachability data corresponding to a plurality of sites of the first customer that are communicatively coupled to the service processing switch, logically dividing the customer VPN into a plurality of edge segments, a plurality of intra-VPN segments and a plurality of inter-VPN segments, the plurality of edge segments connecting the customer VPN to the plurality of sites and including virtual interfaces connected to logical interfaces and tunnel interfaces having remote ends outside the customer VPN, the plurality of intra-VPN segments providing connectivity among customer VRs of the plurality of VRs that are associated with the customer VPN, and the plurality of inter-VPN segments providing connectivity between the customer VPN and a service provider VPN, receiving at a service management system associated with the service provider from a customer network management system associated with the first customer, a custom routing profile associated with the customer VPN, the custom routing profile identifying a first routing protocol to be used for the plurality of intra-VPN segments and a second routing protocol to be used for the plurality of edge segments, and the service management system automatically configuring the customer VPN by programmatically generating appropriate routing configurations for the customer VRs based on the set of site reachability data and the custom routing profile and provisioning the customer VRs.

2. The method of claim 1, wherein the custom routing profile comprises information regarding one or more of the following:

routing administration status;

default site type; and an Open Shortest Path First (OSPF) profile topology type.

3. The method of claim 1, wherein the custom routing profile comprises a site profile.

4. The method of claim 3, wherein the site profile includes a site type.

5. The method of claim 3, wherein the site profile includes a set of one or more site subnets.

6. The method of claim 1, wherein the custom routing profile is based upon a global routing profile.

7. The method of claim 6, wherein the global routing profile includes a default routing protocol for the plurality of edge segments.

8. The method of claim 1, further comprising disseminating the set of site reachability data to other routers within the customer VPN.

9. The method of claim 8, wherein said disseminating the set of site reachability data comprises reading a set of subnets for a customer site of the plurality of sites of the first customer and creating static routes for the set of subnets.

10. The method of claim 8, wherein said disseminating the set of site reachability data comprises placing the set of site reachability information in a directory and providing access to the directory via Lightweight Directory Access Protocol (LDAP).

11. The method of claim 8, wherein said disseminating the set of site reachability data comprises use of a static configuration in which all subnets associated with the plurality of sites are manually configured into the customer VPN.

12. The method of claim 8, wherein said disseminating the set of site reachability data comprises exchanging the set of site reachability data via a routing protocol.

13. The method of claim 8, wherein said disseminating the set of site reachability data comprises conveying the set of site reachability data via Multiprotocol Label Switching Label distribution Protocol (MPLS LDP).

14. The method of claim 8, wherein said disseminating the set of site reachability data comprises piggybacking the set of site reachability data on an Internet Protocol (IP) backbone routing protocol.

15. The method of claim 1, wherein the custom routing profile comprises an Open Shortest Path First (OSPF) profile and wherein the OSPF profile includes a route aggregation policy.

16. The method of claim 1, wherein the custom routing profile includes an area defining a set of VRs of the customer VRs, and wherein said programmatically generating appropriate routing configurations for the customer VRs includes generating a routing configuration for each VR in the set of VRs.

17. The method of claim 1, further comprising receiving a selection of one or more of the customer VRs to receive the programmatically generated routing configurations.

18. The method of claim 1, wherein said programmatically generating appropriate routing configurations for the customer VRs further comprises auto-generation of static routes for the customer VPN.

19. The method of claim 1, wherein the custom routing profile includes parameters relating to one or more of Internet Protocol Security (IPSec), LT2P, Point-to-Point Tunneling Protocol (PPTP), Generic Route Encapsulation (GRE) protocol and Multiprotocol Label Switching (MPLS).

20. The method of claim 1, further comprising providing a plurality of fixed routing profiles that are offered to the plurality of customers by the service provider as part of various differentiated service packages.

21. The method of claim 20, wherein the various differentiated service packages include one or more of the following:

a first service package that permits a customer to configure OSPF for the plurality of intra-VPN segments and the plurality of edge segments;

a second service package that permits the customer to configure OSPF for the plurality of intra-VPN segments and Routing Information Protocol (RIP) for the plurality of edge segments; and a third service packet that permits the customer to configure static routing for the plurality of intra-VPN segments and the plurality of edge segments.

22. A method comprising:

causing a subset of processing resources of a plurality of processing elements of a service processing switch to be allocated among a plurality of customers of a service provider by establishing a plurality of virtual routers (VRs) and assigning a subset of the VRs to the plurality of customers; and performing a profile-driven routing configuration of each of a plurality of customer virtual private networks (VPNs) for the plurality of customers by for each of the plurality of customers and each of the plurality of customer VPNs:

programmatically determining a set of site reachability data for a plurality of sites of the customer that are communicatively coupled to the service processing switch, receiving at a service management system associated with the service provider from a customer network management system associated with the customer, a custom routing profile associated with the customer VPN, the custom routing profile identifying one or more routing protocols to be used for segments of the customer VPN, and the service management system automatically configuring the customer VPN by (i) programmatically generating appropriate routing configurations for associated customer VRs of the plurality of VRs based on the set of site reachability data and the custom routing profile and (ii) provisioning the customer VRs.

23. The method of claim 22, wherein the custom routing profile is based upon a global routing profile.

24. The method of claim 23, wherein the global routing profile includes a default routing protocol for a plurality of edge segments of the segments of the customer VPN.

25. The method of claim 22, further comprising disseminating the set of site reachability data to other routers within the customer VPN.

26. The method of claim 25, wherein said disseminating the set of site reachability data comprises reading a set of subnets for a customer site of the plurality of sites of the customer and creating static routes for the set of subnets.

27. The method of claim 25, wherein said disseminating the set of site reachability data comprises reading a set of subnets for a customer site of the plurality of sites of the first customer and creating static routes for the set of subnets.

28. The method of claim 25, wherein said disseminating the set of site reachability data comprises placing the set of site reachability information in a directory and providing access to the directory via Lightweight Directory Access Protocol (LDAP).

29. The method of claim 25, wherein said disseminating the set of site reachability data comprises use of a static configuration in which all subnets associated with the plurality of sites are manually configured into the customer VPN.

30. The method of claim 25, wherein said disseminating the set of site reachability data comprises exchanging the set of site reachability data via a routing protocol.

31. The method of claim 25, wherein said disseminating the set of site reachability data comprises conveying the set of site reachability data via Multiprotocol Label Switching Label distribution Protocol (MPLS LDP).

32. The method of claim 25, wherein said disseminating the set of site reachability data comprises piggybacking the set of site reachability data on an Internet Protocol (IP) backbone routing protocol.

33. The method of claim 22, further comprising receiving an indication of one or more of the associated customer VRs to receive the programmatically generated routing configurations for each of the plurality of customers.

34. The method of claim 22, wherein the custom routing profile comprises information regarding one or more of the following:

routing administration status;

default site type; and an Open Shortest Path First (OSPF) profile topology type.

35. The method of claim 22, wherein the custom routing profile includes parameters relating to one or more of Internet Protocol Security (IPSec), LT2P, Point-to-Point Tunneling Protocol (PPTP), Generic Route Encapsulation (GRE) protocol and Multiprotocol Label Switching (MPLS).

36. The method of claim 22, further comprising providing a plurality of fixed routing profiles that are offered to the plurality of customers by the service provider as part of various differentiated service packages.

37. The method of claim 36, wherein the various differentiated service packages include one or more of the following:

a first service package that permits a customer to configure OSPF for intra-VPN segments and edge segments;

a second service package that permits the customer to configure OSPF for the intra-VPN segments and Routing Information Protocol (RIP) for the edge segments; and a third service packet that permits the customer to configure static routing for the intra-VPN segments and the edge segments.

* * * * *